United States Patent [19]

Nicewonger et al.

[11] Patent Number: 6,026,838
[45] Date of Patent: Feb. 22, 2000

[54] METHOD FOR DETECTING OPENING IN FLUID FLOW PASSAGEWAY AND SHUTTING OFF FLOW IN RESPONSE THERETO

[75] Inventors: Mark R. Nicewonger, Aptos; Tommy K. Yiu, San Jose, both of Calif.

[73] Assignee: Proteus Industries, Inc., Mountainview, Calif.

[21] Appl. No.: 09/054,234

[22] Filed: Apr. 2, 1998

[51] Int. Cl.[7] .................................................. F16K 17/20
[52] U.S. Cl. ........................... 137/2; 137/487.5; 137/595; 137/459; 251/9; 219/86.31; 219/120; 73/196; 73/197; 73/861.77; 73/861.79
[58] Field of Search ............................... 137/595, 624.11, 137/624.12, 487.5, 459, 2; 219/86.31, 120; 251/4, 7, 9; 73/196, 197, 861.77, 861.79

[56] References Cited

U.S. PATENT DOCUMENTS

| | | |
|---|---|---|
| 4,471,799 | 9/1984 | Buck . |
| 4,484,599 | 11/1984 | Hanover et al. ..................... 137/595 X |
| 4,606,368 | 8/1986 | McCafferty . |
| 4,633,213 | 12/1986 | Venema ...................................... 340/60 |
| 4,694,861 | 9/1987 | Goodale et al. ..................... 137/595 X |
| 5,007,453 | 4/1991 | Berkowitz et al. ............... 137/487.5 X |
| 5,226,471 | 7/1993 | Stefani ....................................... 165/13 |
| 5,287,884 | 2/1994 | Cohen ............................. 137/624.12 X |
| 5,568,825 | 10/1996 | Faulk .................................. 137/624.11 |
| 5,719,367 | 2/1998 | Young .................................. 137/459 X |
| 5,782,263 | 7/1998 | Isaacson et al. ...................... 137/487.5 |
| 5,811,674 | 9/1998 | McCormick ............................... 73/196 |

*Primary Examiner*—Henry Bennett
*Assistant Examiner*—Ramyar Farid
*Attorney, Agent, or Firm*—David G. Alexander

[57] ABSTRACT

An apparatus detects an opening in a fluid flow passageway such as occurs when a resistance welding cap which is cooled by the fluid flow becomes accidently detached from a welding machine. Upon detection of an opening, an air-actuated pinch lever is activated to quickly pinch shut flexible fluid inlet and outlet hoses and thereby shut off the fluid flow. Inlet and outlet flow rate sensors provide periodic outputs to a digital computer which determines directions of inlet and outlet flow acceleration. If either the inlet or outlet acceleration changes direction, a baseline inlet or outlet flow rate is set equal to the corresponding current flow rate value to prevent erroneous opening detection due to normal flow fluctuations. If the inlet and outlet accelerations are in the same direction, the baseline values are similarly updated. If the inlet acceleration is positive and the outlet acceleration is negative, it indicates a probable opening. Another test is made to preclude an erroneous detection by determining if the inlet and outlet flow rates are different from the baseline values by more than a predetermined percentage. If so, a valid opening is indicated and the fluid flow is shut off.

21 Claims, 6 Drawing Sheets

METHOD FOR DETECTING OPENING IN FLUID FLOW PASSAGEWAY AND SHUTTING OFF FLOW IN RESPONSE THERETO

BACKGROUND OF THE INVENTION

1. Field of the Invention

The present invention generally relates to the art of fluid flow control, and more specifically to a method for detecting an opening in a fluid flow passageway and shutting off the flow in response thereto.

2. Description of the Related Art

In many fluid flow systems there is a high probability of a catastrophic opening or break at some point in the flow path which would allow the fluid to escape. For systems where this poses any type of risk it is desirable to have some method of break detection which allows for appropriate measures to be taken in a timely manner to stop or contain the escape of fluid.

An exemplary apparatus to which the present invention is especially applicable is a water cooling system for an resistance welding machine. Spillage of a substantial amount of water, especially in an environment of high electrical current, is not at all desirable.

An example of a leakage detection system is a human who is operating of a piece of liquid cooled equipment and sees the occurrence of a break in the cooling line and responds by shutting down the equipment and closing one or more valves to stop the coolant flow. In systems where there is no human presence, or human response is not quick enough or escaping fluid poses a human risk, some method of automatic detection is required which can then trigger an automatic response.

Breaks or openings in a fluid flow system are often detected by measuring a change beyond a predetermined level in either the fluid flow rate or pressure. The measurement can be made at either the inlet or outlet to the flow circuit. A break in the flow circuit will typically result in a pressure drop at both the inlet and outlet, a flow increase at the inlet, a flow decrease at the outlet and in cases where there is back pressure at the outlet, there may be a reverse in flow direction at the outlet.

Although sensing for one of these changes at a flow circuit's inlet or outlet is effective in many cases, there are instances where the detection system may be unreliable because of normally occurring variations in pressure at the flow circuit's inlet or outlet, or other factors such as multiple paths in the flow circuit or high pressure drops due to long or restricted paths. An unreliable system may result in either a failure to detect when a break occurs or a false indication of a break when none has occurred.

SUMMARY OF THE INVENTION

It is an object of the present invention to overcome the limitations of the prior art and provide a method and apparatus for automatically and reliably detecting an opening or break in a fluid flow passageway, and quickly shutting off the fluid flow in response to a detection.

It is a further object of the present invention to eliminate significant fluid leakage in an environment in which high levels of electrical current are present.

More specifically, a method implementing the present invention detects an opening in a fluid flow passageway such as occurs when a resistance welding cap which is cooled by the fluid flow becomes accidently detached from a welding machine. Upon detection of an opening, an air-actuated pinch lever is activated to quickly pinch shut flexible fluid inlet and outlet hoses and thereby shut off the fluid flow.

Inlet and outlet flow rate sensors provide periodic outputs to a digital computer which determines directions of inlet and outlet flow acceleration. If either the inlet or outlet acceleration changes direction, a baseline inlet or outlet flow rate is set equal to the corresponding current flow rate value to prevent erroneous opening detection due to normal flow fluctuations.

If the inlet and outlet accelerations are in the same direction, the baseline values are similarly updated. If the inlet acceleration is positive and the outlet acceleration is negative, it indicates a probable opening. Another test is made to preclude an erroneous detection by determining if the inlet and outlet flow rates are different from the baseline values by more than a predetermined percentage. If so, a valid opening is indicated and the fluid flow is shut off.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
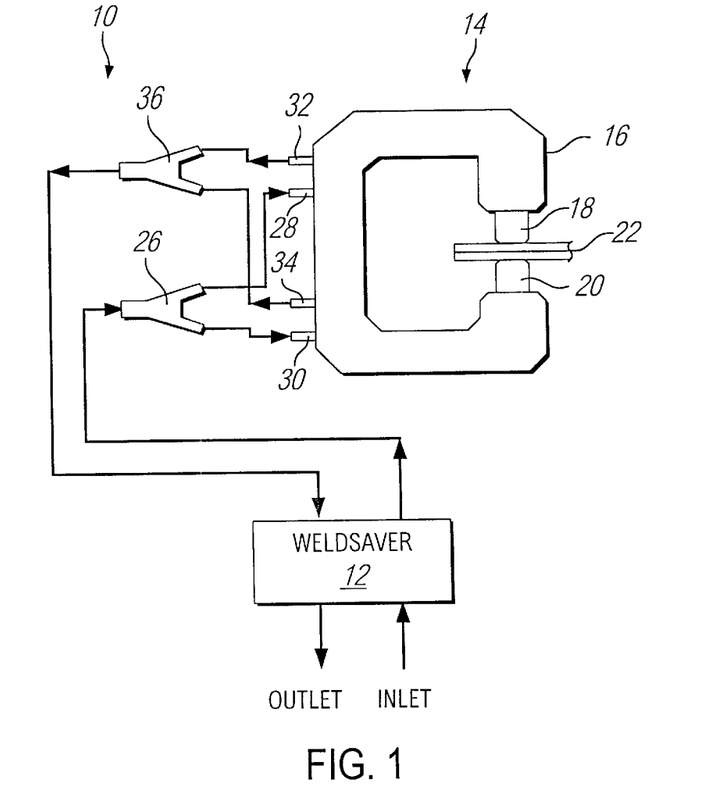
FIG. 1 is a diagram illustrating a fluid flow system incorporating an apparatus according to the present invention.

FIG. 1 illustrates a fluid flow system 10 implementing a method which utilizes an apparatus 12 according to the present invention. An apparatus 12 such as described herein is commercially available from Proteus Industries, Inc. of Mountain View, Calif. under the tradename WeldSaver™

The system 10 is illustrated as being a resistance welding system, although the present invention is not limited to any particular application. The invention can be advantageously utilized in any fluid flow system in which it is desired to detect an opening or break in a fluid flow passageway.

The system 10 includes a resistance welding machine 14 having a hollow frame 16 which supports two vertically opposed copper welding electrodes, also known as welding tips or caps 18 and 20. In operation, a workpiece 22 consisting of two or more metal sheets is clamped between the caps 18 and 20, and an electrical voltage is applied across the caps 18 and 20. This causes a large electric current to flow from one of the caps 18 and 20 to the other through the workpiece 22, raising the temperature of the workpiece 22 to a level which results in localized melting and fusion of the individual sheets of the workpiece 22 together.

The high electric current passing through the caps 18 and 20 would cause them to melt if cooling means were not provided. For this reason, a cooling fluid flow passageway or circuit 24 is provided which extends from an inlet leading to a source of pressurized cooling fluid such as water through the apparatus 12 to fluid flow passageways in the frame 16. Fluid flows from the present apparatus 12 through an inlet Y-connector 26 to upper and lower fluid inlets 28 and 30 of the frame 16. Fluid exits the frame 16 through upper and lower outlets 32 and 34 and an outlet Y-connector 36 and flows through the apparatus 12 to a fluid outlet and reservoir. The fluid source and reservoir are not part of the invention and are not explicitly illustrated.

It will be noted that the arrangement of FIG. 1 is exemplary only and not limitative of the scope of the invention. Other typical configurations include, for example, a series connection of upper and lower flow paths, in which case there are no Y-connectors. In addition, other devices such as power supplies and high current cables which need to be cooled may be inserted into the cooling circuit.

Figure 2:
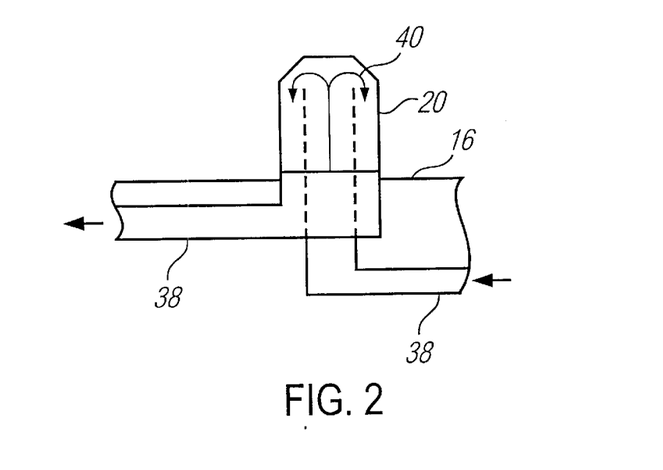
FIG. 2 is a fragmentary diagram illustrating a fluid cooling circuit for a resistance welding cap.

FIG. 2 illustrates fluid passageways in the frame 16 for cooling the welding cap 20. The arrangement is essentially similar for the cap 18. As shown, fluid flows from the inlet 30 through a conduit 38 into the interior of the cap 20, which is hollow. Fluid flows through the cap 20 as indicated by arrows 40, thereby cooling the cap 20 to a temperature at which it will not melt. The fluid exits the cap 20 through a conduit 42 and returns to the reservoir through the outlet 34, Y-connector 36 and apparatus 12.

Although not explicitly illustrated, the caps 18 and 20 are detachably connected to the frame 16, typically by press fitting. Such a connection is sufficient under most conditions. However, sometimes a weld cap will detach from the welding machine. A common cause of weld cap detachment is fusion of the weld cap to the work in progress. This is especially prevalent when welding galvanized parts.

When a weld cap detaches, a large quantity of water spurts out of the frame 16 through the supply conduit 38. Water will also spray out of the return conduit 42 due to back pressure in the line. Spillage of a substantial amount of water, especially in an environment of high electrical current, is not at all desirable. Such water leakage is eliminated by the present apparatus 12.

Figure 3:
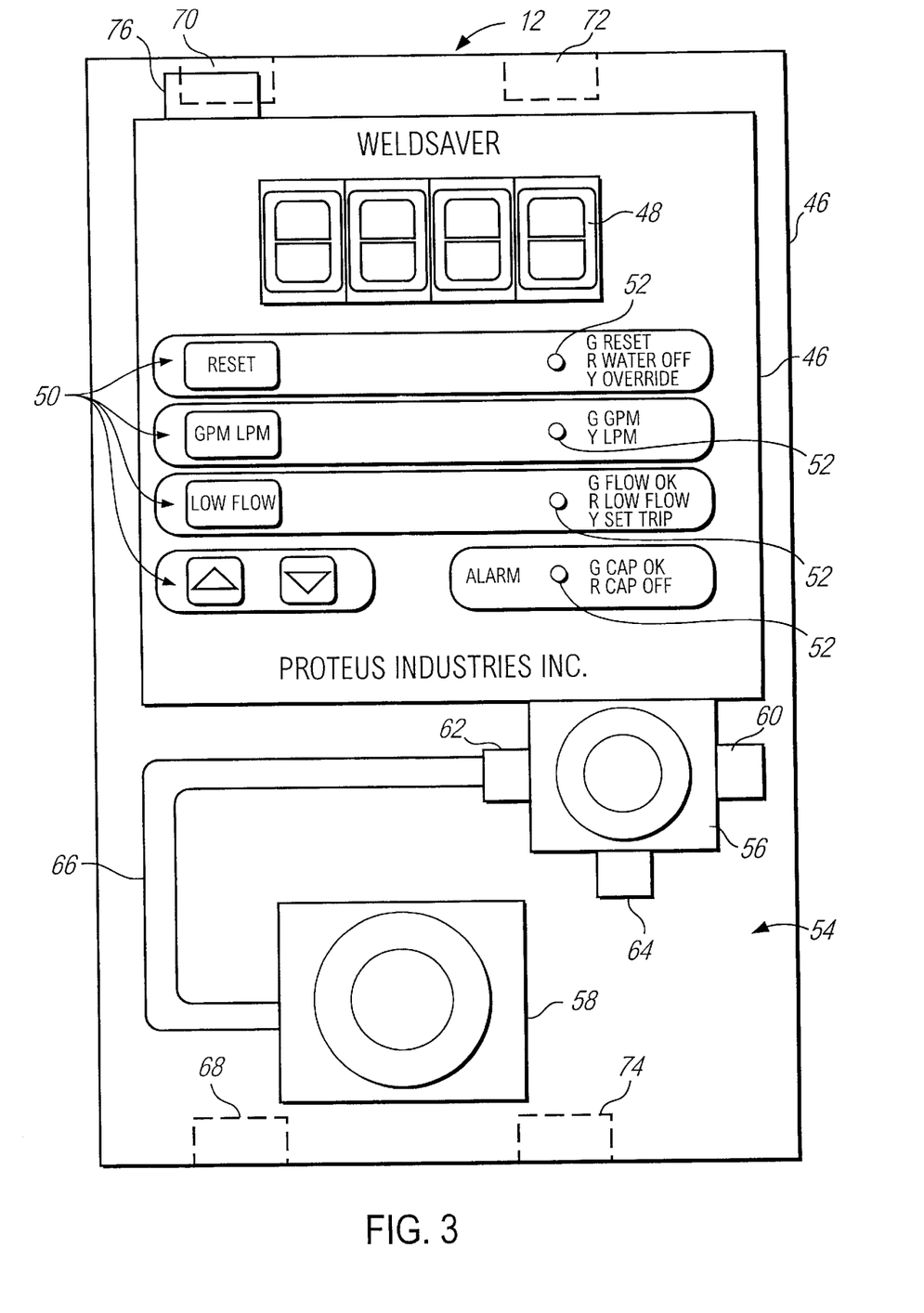
FIG. 3 is a top plan view of the apparatus of the invention.

As viewed in FIG. 3, the present apparatus 12 includes a casing 44 which supports an electronic calculating unit, preferably a digital computer 46 including, although not explicitly illustrated, a conventional microprocessor, ROM memory, RAM memory, an input-output unit, power supply, etc. The computer 46 is programmed to perform the functionality of the present invention by means of an operating program stored in, preferably, the ROM memory.

As viewed in FIG. 3, the face of the computer 46 is provided with a digital display 48 including, as shown, four LED or liquid crystal digits for indicating fluid flow rate and other parameters. The computer 46 is also provided with a plurality of buttons 50 for entering control data, and a plurality of multi-color (e.g. red, green, yellow) LED lamps for indicating various operational conditions as will be described in detail below.

The apparatus 12 further comprises an actuator 54 including an electrical solenoid valve 56 which is controlled by the computer 46, and an pneumatic air cylinder 58. The solenoid valve 56 has an air inlet 64 which is connected to a source of pressurized air (not shown), an air outlet 62 and an exhaust port 60. The outlet 62 is connected through a conduit 66 to the cylinder 58.

The apparatus 12 further has a fluid inlet 68 which is connected to the fluid source, and a fluid outlet 70 which is connected to the inlet Y-connector 26. The apparatus further has a fluid inlet 72 which is connected to the outlet Y-connector 36, and a fluid outlet 74 which is connected to the fluid reservoir. Also illustrated in FIG. 3 is an electrical receptacle 76 for connecting the apparatus 12 to an electrical power source. Typically, the apparatus 12 can be powered by 110 VAC, 230 VAC or 24 VDC.

Figure 4:
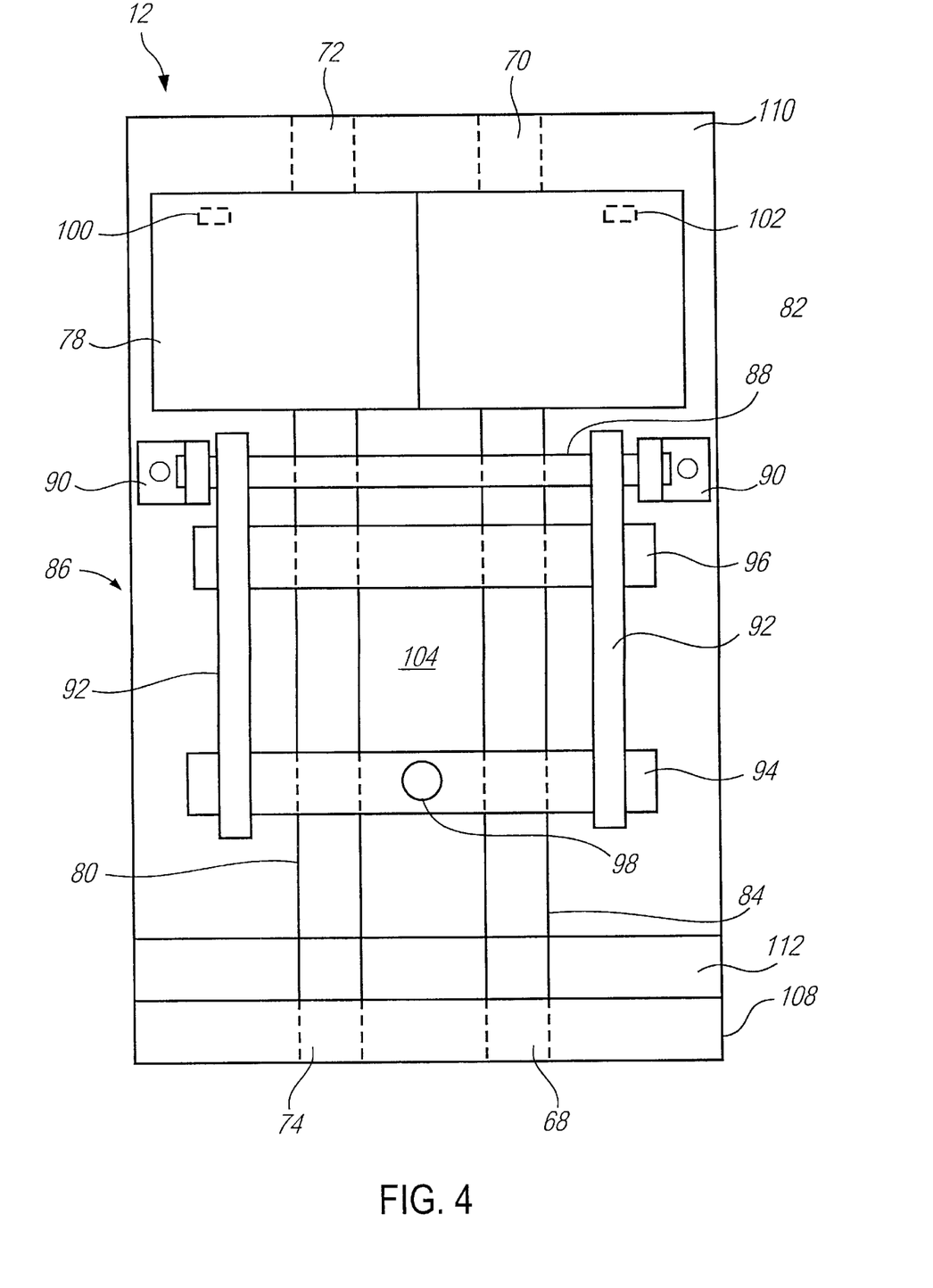
FIG. 4 is a bottom plan view, with a cover removed, of the apparatus.

FIG. 4 illustrates the apparatus 12 as viewed from the bottom with a cover (not shown) and lower base plate removed. The apparatus 12 further includes an inlet flow rate sensor 82 and a flexible inlet conduit or hose 84 which constitutes an inlet section of the fluid flow passageway or circuit 24. The sensor 82 and hose 84 are connected in series with each other between the inlet 68 and the outlet 70. Similarly, an outlet flow rate sensor 78 and a flexible conduit or hose 80 are connected in series between the inlet 72 and outlet 74, with the hose 80 constituting an outlet section of the circuit 24.

The apparatus 12 further comprises a fluid shutoff device 86 which is actuated by the actuator 54. The device 86 includes a pivot rod 88 which is pivotally supported by hangars 90. Right and left pivotal links or levers 92 are each connected at one end to the pivot rod 88 and at the other end to a connector rod 94. A pinch rod 96 is supported by the levers 92 between the rods 88 and 94. The connector rod 94 is connected to the air cylinder 58 by an actuator rod 98. Further illustrated in FIG. 4 are inlet and outlet Hall effect sensors 102 and 100 which will be described in detail below.

Figure 5:
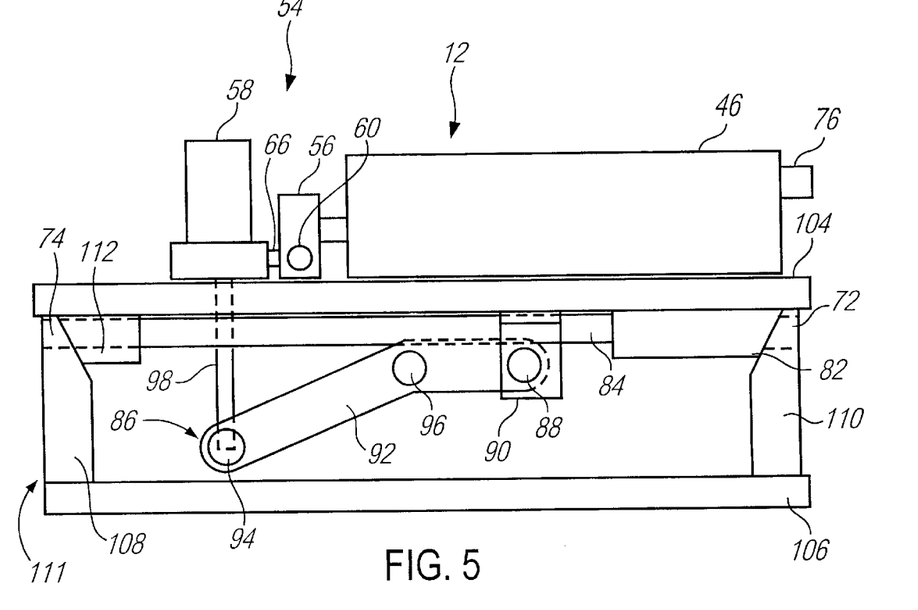
FIGS. 5 and 6 are side elevational views illustrating the apparatus during a normal fluid flow condition and a condition in which the fluid flow is shut off in response to a sensed flow opening or break condition.
Figure 6:
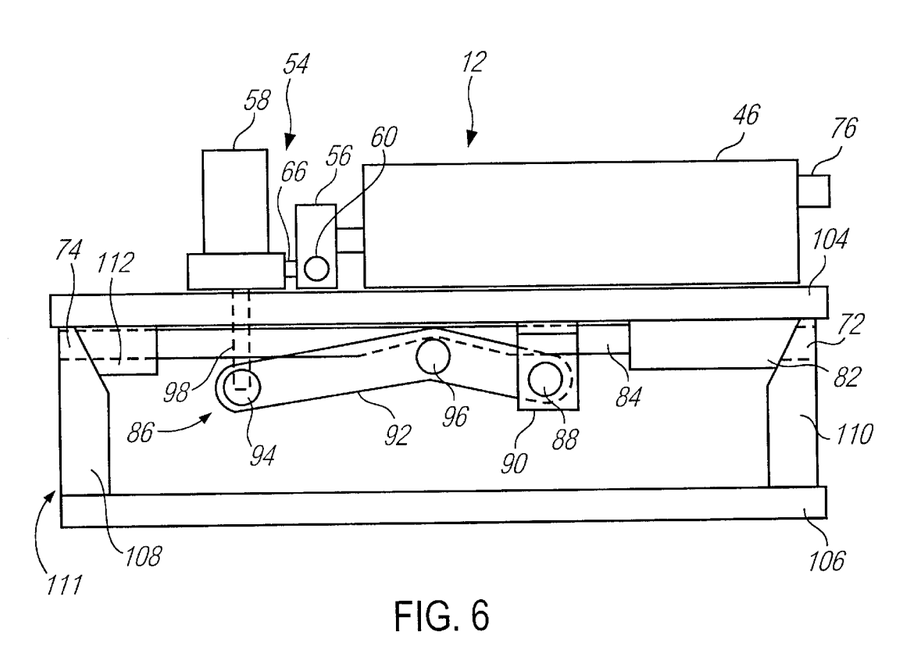

As viewed in FIGS. 5 and 6, the casing 44 includes a upper base plate 104, a lower base plate 106, and end walls 108 and 110 which are attached to the lower base plate 106. A wedge-shaped mounting block 112 is attached to the upper base plate 104. The computer 46, actuator 54 and shutoff device 86 are mounted on the upper base plate 104, whereas this assembly is attached to the end walls 108 and 110 by screws (not shown).

The lower base plate 106 and end walls 108 and 110 in combination constitute a manifold 111. Although not illustrated, it is within the scope of the invention to form the manifold 111 as in integral unit.

As will be further described below, the lower surfaces of the mounting block 112 and sensors 78 and 82 have inclined surfaces which mate with conjugate inclined surfaces of the end walls 108 and 110. This enables fluid to flow through the apparatus 12 in a straight line, thereby minimizing pressure drops which would otherwise be caused by bends in the fluid flow passageway and which could adversely affect the operation of the sensors 78 and 82. Although not visible in the drawing, O-ring seals are preferably provided between the mating surfaces to sealingly connect adjacent fluid flow passageways together.

FIG. 5 illustrates the apparatus 12 in a normal flow state in which an opening or break in the passageway or circuit 24 has not been detected. Although not explicitly illustrated, the air cylinder 58 conventionally includes a piston which is normally biased downwardly as viewed in the drawing by the resilience of the conduits 80 and 84 and the force exerted by the water pressure therein. This maintains the actuator rod 98, which is connected to the piston, in a lower position as illustrated in FIG. 5. When air is introduced into the cylinder 58 underneath the piston, the piston is moved upwardly against the force of the hose resilience and water pressure so that the actuator rod 98 is moved to an upper position as viewed in FIG. 6.

In the normal flow condition of FIG. 5, the levers 92 are pivoted counterclockwise by the actuator rod 98 and connector rod 94 to a disengaged position in which the pinch rod 96 is clear of the inlet and outlet hoses 80 and 84. The solenoid 56 is normally de-actuated so that the conduit 66 and thereby the air cylinder 58 are connected to the exhaust port 60, and no pressurized air is supplied to the cylinder 58.

In response to an opening indication resulting from detection of an opening or break in the circuit 24 (e.g. detachment of a welding cap 18 or 20 from the welding machine 14), the computer 46 sends an electrical opening indication signal to the solenoid 56 which is actuated to connect the inlet 64 to the outlet 62 and thereby supply air from the source to the cylinder 58 through the conduit 66.

This causes the piston of the cylinder 58 to be forced upwardly and move the actuator rod 98 to the upward position of FIG. 6. The levers 92 are pivoted clockwise to the upper position such that the pinch rod 96 is moved to an engaged position in which the pinch rod 96 pinches the hoses 80 and 84 upwardly against the base plate 104. This causes the hoses 80 to be pinched shut and immediately shut of f both inlet and outlet flow and prevent fluid from escaping from the circuit 24.

The sensors 82 and 78 send signals to the computer 46 which correspond to the inlet and outlet flow rates. The computer 46 operates on these signals to determine if an opening or break condition is present. If not, the solenoid 56 is not actuated and fluid flows normally as illustrated in FIG. 5. In response to determination of an opening condition, the computer 46 sends a signal to the actuator 54 which actuates the solenoid 56 and air cylinder 58 to cause the shutoff device 86 to pinch the hoses 80 and 84 shut and stop the flow of fluid through the circuit 24.

Figure 7:
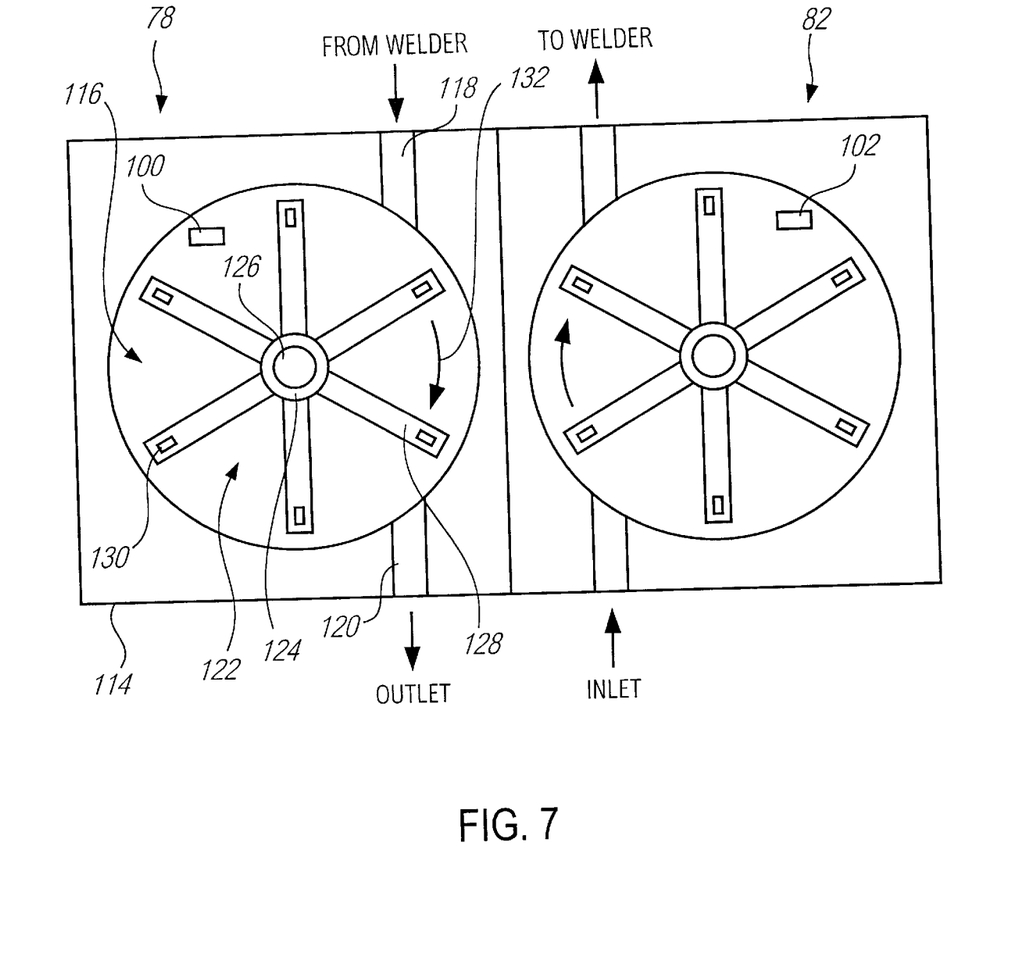
FIG. 7 is a diagram illustrating a dual flow rate sensor arrangement of the invention.

FIG. 7 illustrates the sensors 78 and 82 in more detail. Although the invention is not limited to any particular sensor configuration, the sensor 78 preferably includes a housing 114 which is formed with a circular cavity 116 having an inlet 118 and an outlet 120. A rotary wheel 122 is mounted in the cavity 116, and includes a hub 124 which is rotatably mounted on a shaft 126.

The wheel 122 further includes a plurality of blades 128 which radially extend from the hub 124. A magnet 130 is mounted on each blade 128 facing the Hall effect sensor 100. The wheel 122 can have any desired configuration, such as a Pelton wheel or turbine. Although not explicitly designated by reference numerals, the sensor 82 includes elements which are essentially similar to those of the sensor 78.

In operation, fluid flows through the sensor 78 from the inlet 118 to the outlet 120 through the cavity 116. The flowing fluid causes the wheel 122 to rotate clockwise as indicated by an arrow 132. Each time one of the blades 128 and the magnet 130 carried thereon passes the Hall effect sensor 100, the sensor 100 generates an electrical pulse which is sent to the computer 46. The angular velocity of the wheel 122 is directly proportional to the frequency of the pulses produced by the sensor 100, and is inversely proportional to the period between two successive pulses.

In the arrangement described above, the magnets 130 all have the same polarity, the sensor 100 is a unipolar device and the sensor generates a pulse each time a magnet 130 passes thereby. It is further within the scope of the invention to provide alternating magnets 130 of opposite polarities, in which case the sensor 100 is a bipolar device and a pulse is generated each time two magnets 130 passes thereby. In the latter case, one-half as many pulses are generated for each rotation of the wheel 122.

The angular velocity of the wheel 122 is also related to the fluid flow rate through the sensor 78 by a predetermined function, e.g. direct proportionality or a known non-linear function. Thus, the computer 46 can calculate the fluid flow rate through the sensor 78 as a predetermined function of either the frequency or period of the pulses generated by the sensor 100.

By employing the computer 46 to monitor the flow rate at both the inlet and outlet, a break or opening detection system is implemented in accordance with the present invention which provides a high degree of reliability for a wide variety of flow circuit configurations without the need for predetermined break conditions. This is accomplished by providing a software program to compare the flow rates from the two sensors 78 and 82 to each other.

For relatively non-compressible fluids such as water, the flow rates will remain virtually the same at both points of a flow circuit with no breaks, even with normal pressure variations at the circuit's inlet or outlet. Thus, any significant difference in flow rate between the two sensors would indicate a break in the circuit.

While there are many types of flow sensors that can be used to implement the invention, turbine or pelton wheel type sensors are especially well suited due to their rapid response to changes in flow rate. These sensors are very easily interfaced to microprocessors since they typically output a two-state electrical signal which switches one or more times per revolution of the turbine or pelton wheel. Since the rotational speed is proportional to the fluid velocity, the output is a continuous series of switch pulses at a frequency which is directly proportional to the flow rate.

As pointed out above, a common way to determine the flow rate from a sensor's output frequency is to count the number of pulses which occur in a fixed amount of time. However, at lower flow rates, the output frequency from a sensor is often so low that a counting time period of several seconds is required to achieve an accurate determination of the flow rate. This can be unacceptable for systems which require fast break detection.

A more rapid determination of the flow rate can be made by measuring the period or time between the pulses, which varies inversely with the fluid flow. However, when using this measurement technique with separate sensors on the inlet and outlet of a flow circuit, the two output frequencies will be asynchronous. This presents a timing problem when comparing the flow rates from the two sensors. Since the flow rate determinations are made at different times relative to one another, in most instances one sensor will reflect a normally occurring change in flow rate before the other.

A software program that continually compares the two flow rates can interpret this as a break in the flow circuit when there is none. Thus, when determining flow rates by means of a period measurement, simply comparing the flow rates without accounting for their asynchronous nature is not a reliable method of break detection. Synchronization can add a time delay which once again may be unacceptable when fast break detection is desired.

When using fluid flow sensors with relatively low frequency outputs, the two commonly used software techniques for determining the flow rate (counting pulses and measuring their period) are often inadequate for rapidly and reliably detecting breaks in a fluid flow circuit. Counting pulses can be too slow at low flow rates, and measuring their period introduces a synchronization delay when using separate sensors at the inlet and outlet of the flow circuit.

Because of these problems, the method embodying the present invention does not detect breaks by comparing flow rates. Instead, the present invention compares the acceleration or deceleration of the outputs from the two sensors. A simple indication of acceleration or deceleration for each of the sensors, along with an indication of the magnitude of the changes, provides sufficient information to determine when a break in the cooling circuit has occurred.

Figure 8:
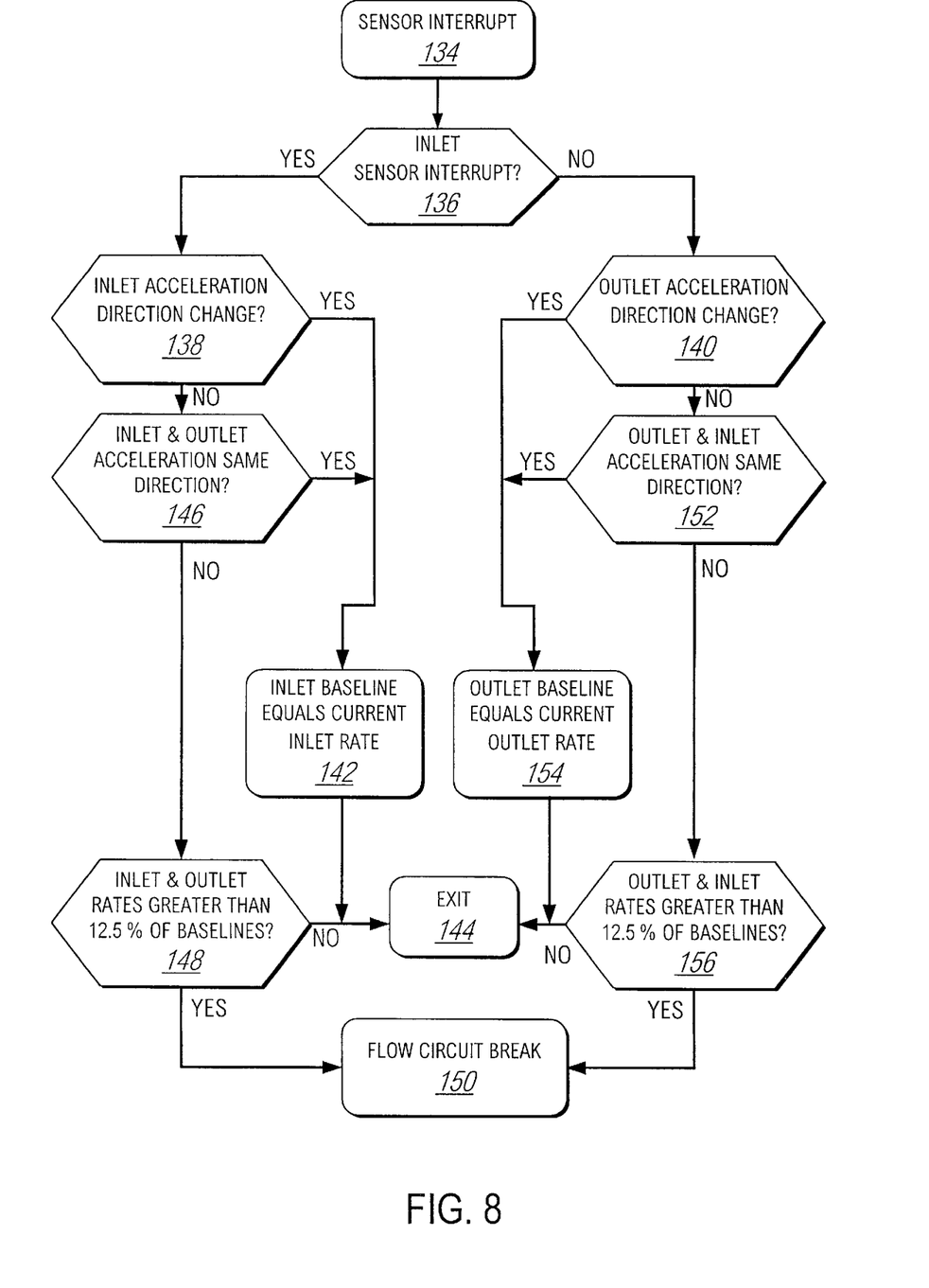
FIG. 8 is a flowchart illustrating the present method of detecting an opening in a fluid flow passageway.

A method for sensing or determining a fluid flow opening or break condition is illustrated in the form of a flowchart in FIG. 8. The sensors 100 and 102 are connected to the computer 46 in such a manner as to generate an interrupt each time one of the magnets 130 passes the sensor as indicated by a step 134.

Upon generation of an interrupt, the software program determines which sensor 100 or 102 generated the interrupt. Preferably, this is done in a step 136 to determine if the inlet sensor 100 generated the interrupt. If this condition is true or present, the process flow branches to a step 138. If the condition is false or absent, the process flow branches to a step 140.

In the step 138, the program determines if a third condition is present in which the inlet acceleration is changing direction, accelerating (positive) to decelerating (negative) or vice-versa. This is done by comparing the time period between the current pulse and a previous pulse with the previously measured time period. If the time period is shorter, this means that the flow rate is accelerating, and if longer, that the flow rate is decelerating. The computer 46 compares the current acceleration state with the previous acceleration state. If the flow was previously accelerating and is now decelerating or vice-versa, this means that the acceleration has changed direction.

If the third condition is present (inlet acceleration changing direction), the flow branches to a step 142 in which a baseline value of inlet flow rate is set equal to the current value of inlet flow rate. The current flow rate is computed as being inversely proportional to (or otherwise related to in a predetermined manner) the period between successive pulses. The baseline value provides a comparison for subsequent steps as will be described below. After performing step 142, the process exits at a step 144 and waits for another interrupt.

If the third condition is absent, the flow branches to a step 146 in which the computer 46 determines if a first condition is present, more specifically if the inlet and outlet flow accelerations are in the same direction (both accelerating or both decelerating). If the first condition is present, the process branches to the step 142.

If the first condition is absent, the process branches to a step 148 in which the computer 46 determines if a second condition is present, more specifically if the inlet and outlet flow rates are both different from the corresponding inlet and outlet baseline values by more than a predetermined amount. If the second condition is absent, the process branches to the step 144. If the second condition is present, the process branches to a step 150 in which a break or opening condition is determined or defined, and the computer 46 generates and sends the opening indication signal to the actuator 54 to stop the fluid flow through the circuit 24.

It will be noted that it is not necessary to compute actual values of flow rate, acceleration and baseline values. These values are represented by their time periods, which are preferably used directly to provide the required comparisons.

The method illustrated in FIG. 8 further includes steps 152, 154 and 156 which are essentially similar to the steps 146, 142 and 148 respectively. The difference is that the steps 152, 154 and 156 are performed for an interrupt generated in response to a pulse from the outlet sensor 102 as determined in step 136.

The process flow in response to either an inlet or outlet interrupt generally consists of three decision blocks. The steps 146,152 and 148,156 are used in combination to detect an opening condition. The steps 146,152 determine the presence of the first condition, in which the inlet and outlet accelerations are in the same direction. Generally, if a fluid line opens due to detachment of a welding cap or the like, the inlet flow will accelerate and the outlet flow will decelerate. The first condition thereby indicates a probable opening in the circuit 24.

The steps 148,156 determine the presence of the second condition in which the inlet and outlet flow rates each differ from the previously set baseline values by more than a predetermined amount. This condition is used in combination with the first condition to avoid an erroneous opening determination which could occur if the first condition was used alone. In a typical fluid flow application the pressure, flow rate and acceleration will fluctuate randomly due to various conditions. Small fluctuations should be ignored as they do not indicate an actual opening or break condition. This function is performed by the steps 148,156.

In accordance with a preferred embodiment of the invention, the difference between the current flow rates and the previously set baseline values above which an opening condition is determined must be greater than 12.5%. However, this value can be varied in accordance with a particular application. Larger values provide lower sensitivity whereas smaller values provide higher sensitivity. Generally, the values will be selected within the range of approximately 5% to 25%, although values outside this range are within the scope of the invention.

The steps 138,140 serve to update the baseline values to accommodate for drift resulting from minor fluctuations. This is performed in response to the third condition, which is a directional change in flow acceleration, and indicates that a change is occurring which requires the baseline values to be updated in order to prevent an erroneous opening detection in step 148 or 156. Although the presence of the third condition could also indicate a probable opening, the detection of the opening is deferred until another interrupt is generated.

Steps 146 and 152 as described above are preferred as they enable bidirectional connection of the apparatus 12. As such, it does not matter which of the sensors 78 and 82 is used for the inlet or the outlet because the first condition is independent of the directions in which the inlet and outlet accelerations are changing. Thus, it is not possible to configure the system 10 erroneously by connecting the outlet sensor 82 to the inlet and the inlet sensor 80 to the outlet.

However, it is within the scope of the invention to limit steps 146 and 152 to detect the first condition in an altered manner in which the first condition will be determined to be present if the inlet acceleration is positive and the outlet acceleration is negative. This condition will be present in essentially all circumstances in which an opening in the circuit 24 occurs. This version of the present method is not bidirectional, and the inlets and outlets must be connected properly.

With reference being made again to FIG. 3, the computer 46 is further preferably programmed to detect a low flow condition. This can result from a fluid supply failure, and will also occur when the flow is shut off by the shutoff device 86. This is accomplished by the computer program which further detects whether either or both of the inlet and outlet flow rates is below a predetermined trip point value.

The computer 46 can activate one of the lamps 52 and/or generate an audible alarm in response to either or both of the opening and low flow conditions. The computer can also transmit a signal or message to a control center and/or send a fault signal to the welding controller to immediately shut down the welding operation.

After correcting either an opening or a low flow indication, the apparatus 12 must be reset to enable fluid flow to be restored after the indicated condition has been corrected. This can be accomplished by configuring the computer 46 such that one of the buttons 50 can be depressed to perform a reset function, such that the shutoff device 86 is de-actuated to restore fluid flow, and the opening detection function is inhibited for a predetermined length of time which is sufficient to enable fluid flow to be restored and stabilized.

Although not explicitly illustrated, the welding controller is preferably a robot. The apparatus 12 normally generates an "OK to weld" signal, which is made logically low or false in response to an opening or low flow condition. The apparatus 12 is preferably provided with a single input which allows the reset function (override) to be controlled by the robot controller. The apparatus 12 can be optionally equipped with a serial interface such as a DeviceNet local area network interface instead of two discrete signals, in which case the same information is conveyed, plus the actual flow rate is also communicated to the welding robot controller.

As illustrated, the buttons 50 and lamps 52 can be further configured in combination with the display 48 to set the low flow trip point, change the display 48 to read either gallons per minute or liters per minute, etc.

To explain the present opening detection method in more detail, the preferred practice is for the software routine or program to be interrupt driven so that it executes once for each pulse received in step 134 of FIG. 8, with the time between interrupts being determined by a hardware timer which is provided as a function of the microprocessor. The preferred practice is for a single software routine to handle the pulses from both sensors, and then decide which sensor caused the interrupt in step 136 so that separate variables for each sensor can be maintained. However, the method can also be performed using a separate interrupt routine for each sensor.

There are two keys to the operation of the present invention. The first is the establishment of the relationship between the acceleration or deceleration of the output rates from the two sensors in steps 138, 140 and 146,152. The second is the maintenance of a baseline flow value for each sensor in steps 142,154. The baseline is used to determine the amount of magnitude change which will be interpreted as an opening or break condition once the proper acceleration/deceleration relationship between the two sensors has been established.

As shown in the flowchart, for a normally flowing fluid circuit, the baseline flow value for each sensor is updated in steps 142,154 under either of two conditions. It is updated each time the period measurement from a sensor indicates that. the flow rate has changed in steps 138,140 from either an accelerating to decelerating state, or from a decelerating to accelerating state, relative to the previous measurement for that sensor.

In the case where the acceleration state for a sensor has not changed, then the states of both sensors are compared to each other in steps 146,152. If they are in the same state, then the baseline flow value is also updated. After the baseline flow value is updated, the routine terminates in step 144 and is not executed again until the next interrupt occurs.

Once it is established that the flow in one sensor is accelerating and the other is decelerating, the routine checks to see if the cumulative magnitude change for each sensor is greater than the break threshold in steps 148,156 which is calculated as a percentage of the baseline flow value. The preferred practice is for the magnitude thresholds to be a fixed percentage (12.5%) of the baseline flow value.

The threshold percentage may also be a variable which is set by some external input device, thereby allowing for adjustable break detection sensitivity. When both sensors have passed their thresholds, a break in the fluid flow circuit has definitely occurred, and program control passes to a routine for handling the opening or break condition in step 150.

As viewed in the flowchart, each sensor has three primary decision blocks (138,146,148 for the inlet sensor 78 and 140,152,156 for the outlet sensor 82) which determine the occurrence of a break in the fluid flow circuit 24. The order of these blocks is important in that the acceleration state change detection block 138, 140 for each sensor must be executed first. But the order of the remaining two blocks 146,148 and 152,156 may be reversed without any significant impact on the method's effectiveness in detecting a break in the flow circuit 24.

Other functions which are non-essential for the rapid detection of a catastrophic break in the flow circuit, such as checking for low flow or no flow conditions, determining that the output frequencies from the sensors are within their proper operating range and the calculation of actual flow rates for external display, are also included in the software routine which embodies the present method as pointed out above. Since the present method can only detect breaks which occur while the routine is executing, additional functions such as the actual comparison of flow rates from the two sensors may also be included to detect pre-existing breaks.

The present method has been successfully implemented by Proteus Industries Incorporated on the company's Weld-Saver™ product line. The WeldSaver will detect and stop, in one second or less, the escape of water from breaks in the fluid flow systems used to cool robotic resistance welding electrodes. Because of it's rapid break detection software algorithm, the WeldSaver does not rely on any preset flow rate or pressure trip points, and thus operates over a wide range of normally occurring inlet and outlet pressure variations. WeldSavers have been installed in several automotive manufacturing facilities, and have proven to be both extremely reliable and effective.

Various modifications will become possible for those skilled in the art after receiving the teachings of the present disclosure without departing from the scope thereof.

For example, the pivotal levers 92 can be eliminated, and the pinch rod 96 connected directly to the actuator rod 98 of the air cylinder 58. In this case, the air cylinder 58 would be relocated so that the actuator rod 98 would move the pinch rod 96 into and out of pinching engagement with the conduits 80 and 84 in a straight line. This would provide a more economical installation, although a larger air cylinder might be required since the mechanical advantage provided by the levers 92 would not be available.

Another alternative is to provide the apparatus 12 as a unit which does not include the actuator 54 and shutoff device 86. These elements can be provided separately and connected to the apparatus 12 per se by suitable electrical connections. The external actuator shutoff device can be controlled by the "OK to weld" signal generated by the apparatus 12, or by the welding robot controller in response to the "OK to weld" signal.

What is claimed is:

1. A method for detecting an opening in a fluid flow passageway having an inlet and an outlet, comprising the steps of:

(a) sensing for a first condition in which an inlet flow acceleration and an outlet flow acceleration are in different directions;

(b) sensing for a second condition in which an inlet flow rate is different from an inlet baseline value by more than a first predetermined value, and an outlet flow rate is different from an outlet baseline value by more than a second predetermined value; and (c) generating an opening detection indication in response to presence of both the first and second conditions.

2. A method as in claim 1, in which step (a) is performed before step (b).

3. A method as in claim 1, in which step (b) is performed before step (a).

4. A method as in claim 1, further comprising the steps of:

(d) sensing for a third condition in which the inlet flow acceleration has changed direction;

(e) setting the inlet baseline value equal to the inlet flow rate in response to presence of the third condition;

(f) sensing for a fourth condition in which the outlet flow acceleration has changed direction; and (g) setting the outlet baseline value equal to the outlet flow rate in response to presence of the fourth condition.

5. A method as in claim 1, further comprising the steps of:

(d) sensing for a third condition in which the inlet flow acceleration has changed direction;

(e) performing step (a) in response to absence of the third condition;

(f) sensing for a fourth condition in which the outlet flow acceleration has changed direction; and (g) performing step (a) in response to absence of the fourth condition.

6. A method as in claim 5, in which steps (d) and (f) are performed before step (a).

7. A method as in claim 1, further comprising the steps of:

(d) sensing for a third condition in which the inlet flow acceleration has changed direction;

(e) performing step (b) in response to absence of the third condition;

(f) sensing for a fourth condition in which the outlet flow acceleration has changed direction; and (g) performing step (b) in response to absence of the fourth condition.

8. A method as in claim 7, in which steps (d) and (f) are performed before step (b).

9. A method as in claim 1, further comprising the steps of:

(d) sensing for a third condition in which the inlet flow acceleration has changed direction;

(e) setting the inlet baseline value equal to the inlet flow rate in response to absence of both the first and third conditions;

(f) sensing for a fourth condition in which the outlet flow acceleration has changed direction;

(g) setting the outlet baseline value equal to the outlet flow rate in response to absence of both the first and fourth conditions.

10. A method as in claim 9, in which steps (d) and (f) are performed before step (b).

11. A method as in claim 1, in which:

the fluid flow passageway comprises a detachable member; and the opening is constituted by detachment of the detachable member.

12. A method as in claim 11, in which the detachable member comprises a welding cap.

13. A method as in claim 1, further comprising the step of:

(d) stopping fluid flow through the inlet and the outlet in response to the opening detection indication.

14. A method as in claim 13, in which:

the fluid flow passageway comprises a flexible inlet section which communicates with the inlet and a flexible outlet section which communicates with the outlet; and step (d) comprises pinching shut the inlet section and the outlet section.

15. A method as in claim 1, in which the first and second predetermined values are equal.

16. A method as in claim 1, in which the first and second predetermined values are within a range of approximately 5% to 25%.

17. A method as in claim 1, in which the first and second predetermined values are approximately 12.5%.

18. A method as in claim 1, further comprising the step of:

(d) sensing for a third condition in which an inlet flow rate is below a predetermined trip point value; and (e) generating a low flow indication in response to presence of the third condition.

19. A method as in claim 1, further comprising the step of:

(d) sensing for a third condition in which an outlet flow rate is below a predetermined trip point value; and (e) generating a low flow indication in response to presence of the third condition.

20. A method as in claim 1, further comprising the steps of:

(d) sensing for a third condition in which a flow rate is below a predetermined trip point value;

(e) generating a low flow indication in response to presence of the third condition;

(f) terminating performing steps (a), (b) and (c);

(g) sensing for a fourth condition in which the flow rate has increased above the trip point value; and (h) performing steps (a), (b) and (c) in response to presence of the fourth condition.

21. A method as in claim 1, in which step (a) is limited to sensing the first condition such that the inlet acceleration is positive and the outlet acceleration is negative.

* * * * *